United States Patent [19]

Roberts

[11] 4,380,497

[45] Apr. 19, 1983

[54] AMINES OF ALKOXYDIPHENYL ESTHERS AS ANTIOXIDANTS AND LUBRICATING OILS AND GREASES CONTAINING SAME

[75] Inventor: John T. Roberts, Arlington Heights, Ill.

[73] Assignee: UOP Inc., Des Plaines, Ill.

[21] Appl. No.: 263,376

[22] Filed: May 12, 1981

[51] Int. Cl.³ .............................................. C10M 1/38
[52] U.S. Cl. ............................. 252/47.5; 252/51.5 R; 252/402; 252/403
[58] Field of Search ............... 252/47.5, 51.5 R, 402, 252/403

[56] References Cited

U.S. PATENT DOCUMENTS

| | | | |
|---|---|---|---|
| 2,216,752 | 10/1940 | Rosen ............................. | 252/47.5 X |
| 2,910,437 | 10/1959 | Symon ........................... | 252/51.5 R X |
| 2,964,479 | 12/1960 | Cyba .............................. | 252/51.5 R X |
| 2,982,729 | 5/1961 | Cyba et al. ..................... | 252/40.7 |
| 3,122,575 | 2/1964 | Peterson et al. ............. | 252/51.5 R X |
| 3,240,706 | 3/1966 | Cyba et al. ..................... | 252/51.5 R |
| 3,502,581 | 3/1970 | Cyba .............................. | 252/51.5 R |
| 4,309,294 | 1/1982 | Roberts ......................... | 252/47.5 X |

*Primary Examiner*—Andrew Metz
*Attorney, Agent, or Firm*—James R. Hoatson, Jr.; Eugene I. Synder; William H. Page, II

[57] ABSTRACT

N-Monosubstituted 2'- or 4'-amino-4-alkoxy-diphenyl ethers, where the N-substituent is an arylmethyl group, are effective antioxidants in a wide variety of petroleum products and petroleum related products. Within the class of arylmethyl groups, heteroaryl groups are especially desirable, as exemplified by pyridinylmethyl and thienylmethyl.

20 Claims, No Drawings

AMINES OF ALKOXYDIPHENYL ESTHERS AS ANTIOXIDANTS AND LUBRICATING OILS AND GREASES CONTAINING SAME

BACKGROUND OF THE INVENTION

A persistent problem common to virtually all petroleum products and petroleum-related products is their tendency to undergo oxidative degradation. Oxidation may occur even under the relatively mild conditions attending storage and transport, and is appreciably accelerated when operating conditions are conducive to oxidation processes, for example, the elevated temperatures experienced by lubricating oil. Such oxidative processes not only cause chemical degradation of the petroleum or petroleum-relatedproduct, but may also cause appreciable changes in desirable physical properties, such as viscosity, which lead to a deterioration of product performance characteristics. Additionally, the oxidative products themselves may attack materials in contact with the petroleum and petroleum-related products, such as metals in contact with transmission or lubricating oils, thereby causing inefficient performance and, in extreme cases, even mechanical failure.

The class of N,N'-dialkyl-4,4'-diaminodiphenyl ethers is known to have substantial antioxidant properties, and has found utility as an additive protecting petroleum and petroleum-related products against oxidation in their working environment as shown in U.S. Pat. No. 2,982,729. Unsubstituted 2,4'-diaminodiphenyl ether acts as an effective stabilizer against oxidative deterioration, U.S. Pat. No. 2,910,437, and mixtures of alkylated 4,4'- and 2,4'-diaminodiphenyl ethers act synergistically as an inhibitor according to U.S. Pat. No. 2,964,479. It now has been found that certain amines of 4-alkoxydiphenyl ethers are effective oxidants in the aforementioned products. In some cases these ethers display antioxidant properties exceeding those of the symmetrical diaminodiphenyl ethers, thereby permitting their effective use at relatively lower levels. The antioxidants described herein possess the further advantage that structural changes within broad, but nonetheless well-defined, limits are possible, thereby permitting optimization of the antioxidant for a particular product in a specified use.

SUMMARY OF THE INVENTION

The principal object of this invention is to provide a method of inhibiting oxidation in petroleum products and petroleum-related products by the addition thereto of effective amounts of additives having antioxidant properties, and compositions thereof. An embodiment of this invention comprises the use of amines of 4-alkoxydiphenyl ethers as an additive in said products. In a more specific embodiment the additives are 2'- or 4'-arylmethylamino-4-methoxydiphenyl ethers and the substituted aryl derivatives thereof. In yet another embodiment the additives are present at a concentration from about 0.05 to about 5% by weight.

DESCRIPTION OF THE INVENTION

The materials of this invention are N-monosubstituted 2'- or 4'-amino-4-alkoxydiphenyl ethers. More precisely, the materials may be designated as 2'- or 4'-arylmethylamino-4-alkoxydiphenyl ethers, where aryl is a univalent radical derived from aromatic or heteroaromatic hydrocarbons, or substituted aromatic or heteroaromatic hydrocarbons, by removal of a hydrogen from a carbon of the aromatic or heteroaromatic ring. The discovery of this invention is that the materials of such structure possess potent antioxidant properties and can be effectively used as an additive to retard and inhibit oxidation in petroleum products and petroleum-related products at concentrations as low as about 0.05% by weight.

The additives of the instant application have a common structure represented by the formula,

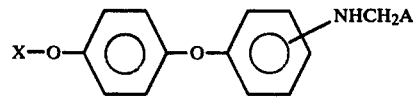

where the group —NHCH$_2$A is located at the 2'- or 4'-position. The group represented by A in the above structure is a univalent radical whose parent is an aromatic or heteroaromatic ring and which is derived from said parent by removal of a hydrogen from a carbon atom of said ring. Examples of such rings include benzene, naphthalene, anthracene, chrysene, pyridine, thiophene, pyrrole, furan, imidazole, oxazole, thiazole, quinoline, carbazole, pyrimidine, purine, and so forth. Where A is the univalent radical from the benzene ring, viz., a phenyl group, it will be recognized that the resulting materials are 2'- or 4'-benzylamino-4-alkoxydiphenyl ethers. In other cases, it will be recognized that the resulting materials are aromatic and heteroaromatic analogs of the benzylaminodiphenyl ethers. The heteroaromatic analogs often are especially desirable materials in this invention.

In some cases it is advantageous to have the aromatic or heteroaromatic ring bearing at least one substituent. Among those substituents often leading to enhanced desirable properties are halogen, especially chlorine, nitro, cyano, carboxyl, and hydroxyl moieties. Another class of substituents which may be effectively used in the materials described herein comprises alkyl, alkoxy, and alkylmercapto where the carbonaceous portion contains up to about 18 carbon atoms. Examples of the latter include methyl, ethyl, propyl, butyl, pentyl, hexyl, heptyl, octyl, nonyl, decyl, undecyl, dodecyl, tridecyl, tetradecyl, pentadecyl, hexadecyl, heptadecyl, and octadecyl. The carbonaceous portion is saturated and may be either a straight or branched chain, although a branched chain is preferred because of increased solubility in products where their use is intended.

The moiety represented by X in the above structure is an alkyl group containing up to about 18 carbon atoms, and may be either a straight or branched chain. A branched chain, where possible, is preferred because of increased solubility in intended products. Examples of suitable alkyl moieties have been given above.

The following are examples of suitable antioxidants according to the foregoing description, and are cited solely for illustrative purposes. Only 4'-arylmethylamino compounds are listed for convenience, but the equivalent 2'-isomers are to be understood to be incorporated herein. 4'-Benzylamino-4-methoxydiphenyl ether; 4'-naphthalenylmethylamino-4-ethoxydiphenyl ether; 4'-anthracenylmethylamino-4-isobutoxydiphenyl ether; 4'-pyridinylmethylamino-4-octyloxydiphenyl ether; 4'-thienylmethylamino-4-decyloxydiphenyl ether; 4'-furanylmethylamino-4-octadecyloxydiphenyl ether, and similar amines where the aromatic group is a univalent radical from imidazole, oxazole, thiazole, quinoline, carbazole, pyrimidine, and the like; 4'-methylbenzylamino-4-methoxydiphenyl ether; 4'-t-butylbenzylamino-4-propoxydiphenyl ether; 4'-methoxybenzylamino-4-methoxydiphenyl ether; 4'-sec-pentoxybenzylamino-4-ethoxydiphenyl ether; 4'-chlorobenzylamino-4-methoxydiphenyl ether; 4'-fluoro-benzylamino-4-methoxydiphenyl ether; 4'-nitrobenzylamino-4-methoxydiphenyl ether; 4'-methylmercaptobenzylamino-4-methoxydiphenyl ether, and so forth.

The preparation of these materials is not novel and suitable methods will be recognized by those skilled in the art. One preparative route is the condensation of the 4-aminodiphenyl ether with an aromatic or heteroaromatic aldehyde, or mixtures of such aldehydes, to afford the Schiff base, or imine, followed by reduction. Typically, such a reaction is conducted in an inert solvent, such as an aliphatic or aromatic hydrocarbon or ether, especially ethers of glycols and polyglycols, in the presence of an acid as catalyst, frequently p-toluenesulfonic acid or a similar acid, or Lewis acids, such as boron trifluoride, with subsequent recovery of the imine as product. Subsequent hydrogenation may be effected with platinum group metal catalysts, nickel, and so on. Alternatively, the materials of this invention may be prepared by reductive alkylation of 4-alkoxy-4'-aminodiphenyl or 4-alkoxy-4'-nitrodiphenyl ethers by aromatic and heteroaromatic aldehydes.

The materials described herein may be used as antioxidants in a wide variety of petroleum and petroleum-related products, and other materials. For example, the materials may be used in lubricating oils and greases, either of synthetic or petroleum origin. Examples, cited for illustrative purposes only, include aliphatic esters, polyalkylene oxides, silicones, fluorine-substituted hydrocarbons, and the like. Lubricating oils of petroleum origin include motor lubricating oil, railroad type lubricating oil, marine oil, transformer oil, transmission oil, turbine oil, gear oil, differential oil, diesel lubricating oil, hydraulic oil, cutting oil, rolling oil, etc. Greases include petroleum grease, whale grease, wool grease, grease from inedible and edible fats, synthetic greases, such as those from mineral or synthetic oils containing hydrocarbon-soluble metal salts of fatty acids, and so forth. The materials of this invention also are suitable for the stabilization of plastics and rubbers obtained from polymerization of various petroleum-derived materials, such as polyethylene, polypropylene, polybutadiene, polystyrene, copolymers of ethylene and butadiene, and the like, polyacrylonitrile, polyacrylates, and so forth.

The materials may be effective as an antioxidant at levels as low as about 0.05% by weight. Higher concentrations, up to about 5% by weight, may be used if desired, although it will be recognized that it is economically advantageous to use these materials at as low a concentration as will be effective.

The materials described in the example are merely illustrative of this invention. It is to be understood that this invention is not to be limited thereto.

EXAMPLE 1

Preparation of 4-N-benzylamino-4'-methoxydiphenyl ether

To a stirred autoclave was added 4-methoxy-4-nitrodiphenyl ether (9.4 g, 38.4 mmol), benzaldehyde (4.1 g, 38.4 mmol), p-toluenesulfonic acid (1.0 g) and absolute ethanol (120 ml). The reaction mixture was stirred and heated to 125° C. for 4 h under 850 psig $H_2$. After cooling to ambient, the black mixture was suction filtered through celite. The filter cake was rinsed with acetone (3 × 15 ml) and added to the filtrate which was concentrated on the flash evaporator. The black semi-solid residue was washed with toluene and concentrated. Vacuum treatment at 80° C. (50 torr), yielded a black waxy material (11.6 g, 38 mmol, 99% yield). NMR ($CDCl_3$) S 4.32 (s, 2H, $NCH_2$) and 3.8 (s, 3H, $OCH_3$).

EXAMPLE 2

Preparation 4-N-(2-pyridinylmethyl)amino-4'-methoxydiphenyl ether

A solution of 4-amino-4'-methoxydiphenyl ether (8.6 g, 40 mmol) and 2-pyridinecarboxaldehyde (5.0 g, 46.6 mmol) in xylenes (100 ml) was heated to reflux for 18 h. Azeotropic distillation removed the water formed in the reaction. The black reaction mixture was cooled to ambient and concentrated on the flash evaporator. A black solid was recovered (11.3 g, 93% yield). NMR ($CDCl_3$) S 8.62 (s, 1H, CH=N) 8.06 (d, 1H, $C_3$—H) 7.50 (t, 1H, $C_5$—H) and 3.68 (s, 3H, $CH_3O$). IR (melt) $1630_{cm}^{-1}$ (C=N). Black solid (3.2 g, 10.5 mmol) was dissolved in toluene and added with 0.1 g 5% Pt/C to a stirred autoclave. The reaction mixture was heated at 147°–153° C. for 8 h under 100 atmospheres of $H_2$. After cooling to ambient, the reaction mixture was suction filtered and concentrated on the flash evaporator. The resulting black oil was heated to 80° C. at 50 torr for 1 h. The residue solidified on cooling. NMR ($CDCl_3$) δ 8.54 (d, 1H, $C_6$—H) 7.52 (t, 1H, $C_5$—H) 4.38 (s, 2H, $NCH_2$) and 3.70 (s, 3H, $OCH_3$).

EXAMPLES 3–12

A standardized test was used to screen the suitability of particular compounds as a stable antioxidant. Air at a constant rate of 50 ml per minute was bubbled through the test oil (a bright stock, Sentry 150 from Citgo) which is held at 275° F. in a thermostatically heated aluminum block. The test oil, to which was added the potential antioxidant, was contained in a large test tube with metal coupons of aluminum, brass, copper, and steel. Heating time for the test was a minimum of five days, but was continued until the oil spot test indicated that the test sample had significantly decomposed. Upon termination of the test the acid number (AN), change in the viscosity expressed as a percentage change ($\Delta V$ %), weight gain and weight loss of the coupons were determined. It has been found that the latter data are most significant for copper coupons, thus only these are reported herein.

The oil spot test consists of placing a drop of oil on a chromatography sheet. The appearance of the brown spot with a distinct perimeter or a spot with material at the center or with a definite ring indicates significant decomposition of the base oil. This was used to determine the length of the test subject to a five-day minimum time.

The results of testing are summarized in the accompanying table.

TABLE

PERFORMANCES OF ADDITIVES AS ANTIOXIDANTS

| Test | Example | Additive[a,b] | AN[c] | Wt. Loss[d] | ΔV %[e] |
|---|---|---|---|---|---|
| 1 | | none | 3.3 | | 22.7 |
| 1 | 3 | A = 4'-C$_6$H$_5$<br>X = CH$_3$ | 0.85 | | 9.0 |
| 2 | | none | 2.4 | 1.9 | 27.3 |
| 2 | 4 | A = 4'-C$_6$H$_5$<br>X = CH$_3$ | 0.7 | 0.9 | 9.8 |
| 2 | 5 | A = 4'-(1-naphthalenyl)<br>X = CH$_3$ | 0.3 | 7.9 | 5.2 |
| 3 | | none | 6.3 | 6.1 | 29.3 |
| 3 | 6 | A = 4'-(2-pyridinyl)<br>X = CH$_3$ | 0.73 | 3.3 | 5.2 |
| 3 | 7 | A = 4'-(2-thienyl) | 1.12 | 2.8 | 9.1 |
| 3 | 8 | Ethyl 702[f] | 1.6 | 3.4 | 9.1 |
| 4 | | none | 6.1 | 7.9 | 49.7 |
| 4 | 9 | A = 2'-(2-pyridinyl)<br>X = CH$_3$ | 1.5 | 2.7 | 7.3 |
| 4 | 10 | A = 4'-(2-pyridinyl)<br>X = CH$_3$ | 1.2 | 1.7 | 5.7 |
| 4 | 11 | A = 4'-(2-furanyl)<br>X = CH$_3$ | 5.8 | 6.3 | 31.7 |
| 4 | 12 | Ethyl 702[f] | 1.0 | 4.8 | 27.0 |

[a] All additives at 0.5 weight % unless otherwise indicated. Because of variability in data of tests performed at different times, a control with no additive was run for every test of a series of materials. Each relevant test is so indicated.
[b] Additives have the formula shown, vide supra, with A and X being designated in this column.
[c] Acid number, ASTM D-974
[d] Copper loss in mg.
[e] Percent change in kinematic viscosity at 100° F.
[f] A commercial product from Ethyl Corporation.

As the data show, the additives described in this invention lead to a substantial decrease in acid number and cause substantially less copper loss when compared to the blank. Equally important is the observation that the additives herein cause only a minor change in viscosity over the lifetime of the test.

What is claimed is:

1. A method of inhibiting oxidation in lubricating oils and greases comprising adding thereto an oxidation inhibiting amount of a material with the structure

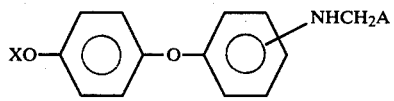

where —NHCH$_2$A is at the 2'- or 4'-position, A is a monovalent radical whose parent is selected from the group consisting of unsubstituted and ring-substituted aromatic and heteroaromatic rings, and X is an alkyl group containing up to about 18 carbon atoms.

2. The method of claim 1 wherein said lubricating oils and greases are synthetic or of petroleum origin.

3. The method of claim 1 where X is methyl.

4. The method of claim 3 wherein A bears at least one other moiety selected from the group consisting of halogen, nitro, cyano, carboxyl, hydroxyl, alkyl, alkoxy, and alkylmercapto where the carbonaceous portion contains up to about 18 carbon atoms.

5. The method of claim 3 wherein A is a monovalent radical whose parent is selected from the group consisting of benzene, naphthalene, anthracene, pyridine, thiophene, pyrrole, furan, imidazole, oxazole, thiazole, quinoline, and carbazole.

6. The method of claim 5 wherein the parent is benzene.

7. The method of claim 5 wherein the parent is pyridine.

8. The method of claim 5 wherein the parent is naphthalene.

9. The method of claim 5 wherein the parent is thiophene.

10. The method of claim 5 wherein the parent is furan.

11. The method of claim 1 wherein the oxidation inhibiting amount is from about 0.05% to about 5% by weight based on said lubricating oils and greases.

12. A composition comprising a major amount of a lubricating oil or grease and a minor amount from about 0.05% to about 5% by weight of a material with the structure,

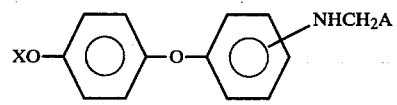

where —NHCH$_2$A is at the 2'- or 4'-position, A is a monovalent radical whose parent is selected from the group consisting of unsubstituted and ring-substituted aromatic and heteroaromatic rings, and X is an alkyl group containing up to about 18 carbon atoms.

13. The composition of claim 1 wherein said lubricating oil or grease is synthetic or of petroleum origin.

14. The composition of claim 12 where X is methyl.

15. The composition of claim 14 wherein A bears at least one other moiety selected from the group consisting of halogen, alkyl, alkoxy, and alkylmercapto where the carbonaceous portion contains up to about 18 carbon atoms, nitro, cyano, carboxyl, and hydroxyl moieties.

16. The composition of claim 14 wherein A is a monovalent radical whose parent is selected from the group consisting of benzene, naphthalene, anthracene, pyridine, thiophene, pyrrole, furan, imidazole, oxazole, thiazole, quinoline, and carbazole.

17. The composition of claim 16 wherein the parent is benzene.

18. The composition of claim 16 wherein the parent is pyridine.

19. The composition of claim 16 wherein the parent is naphthalene.

20. The composition of claim 16 wherein the parent is thiophene.

* * * * *